United States Patent [19]

Pere

[11] 4,415,424
[45] Nov. 15, 1983

[54] DEVICE FOR SUPPLY AND DISCHARGE OF LIQUID ELECTROLYTE FOR AN ELECTROLYZER OF FILTERPRESS TYPE

[75] Inventor: Gerard Pere, Le Breuil, France

[73] Assignee: Creusot-Loire, Paris, France

[21] Appl. No.: 334,601

[22] Filed: Dec. 28, 1981

[30] Foreign Application Priority Data

Jan. 16, 1981 [FR] France ............................. 81 01102

[51] Int. Cl.³ .................. C25B 9/00; C25B 15/08
[52] U.S. Cl. ............................ 204/257; 204/263; 204/269; 204/277
[58] Field of Search ................ 204/255–256, 204/257–258, 269–270, 279, 263–266

[56] References Cited

U.S. PATENT DOCUMENTS

| | | | |
|---|---|---|---|
| 2,689,826 | 9/1954 | Kollsman | 204/257 X |
| 3,962,065 | 6/1976 | Scoville | 204/257 X |
| 4,196,069 | 4/1980 | Mose et al. | 204/257 |
| 4,255,245 | 3/1981 | Maire et al. | 204/257 |
| 4,312,735 | 1/1982 | Grimes et al. | 204/257 X |

*Primary Examiner*—Donald R. Valentine
*Attorney, Agent, or Firm*—Pollock, Vande Sande & Priddy

[57] ABSTRACT

A device for supply or discharge of electrolyte for an electrolyzer of filterpress type has several compartments fed through channels (3) which open out into a common tranquilization chamber (4) of thin cross-section, which in turn is fed with electrolyte by way of a duct twisted, for example, into a spiral (51) of small cross-section.

8 Claims, 8 Drawing Figures

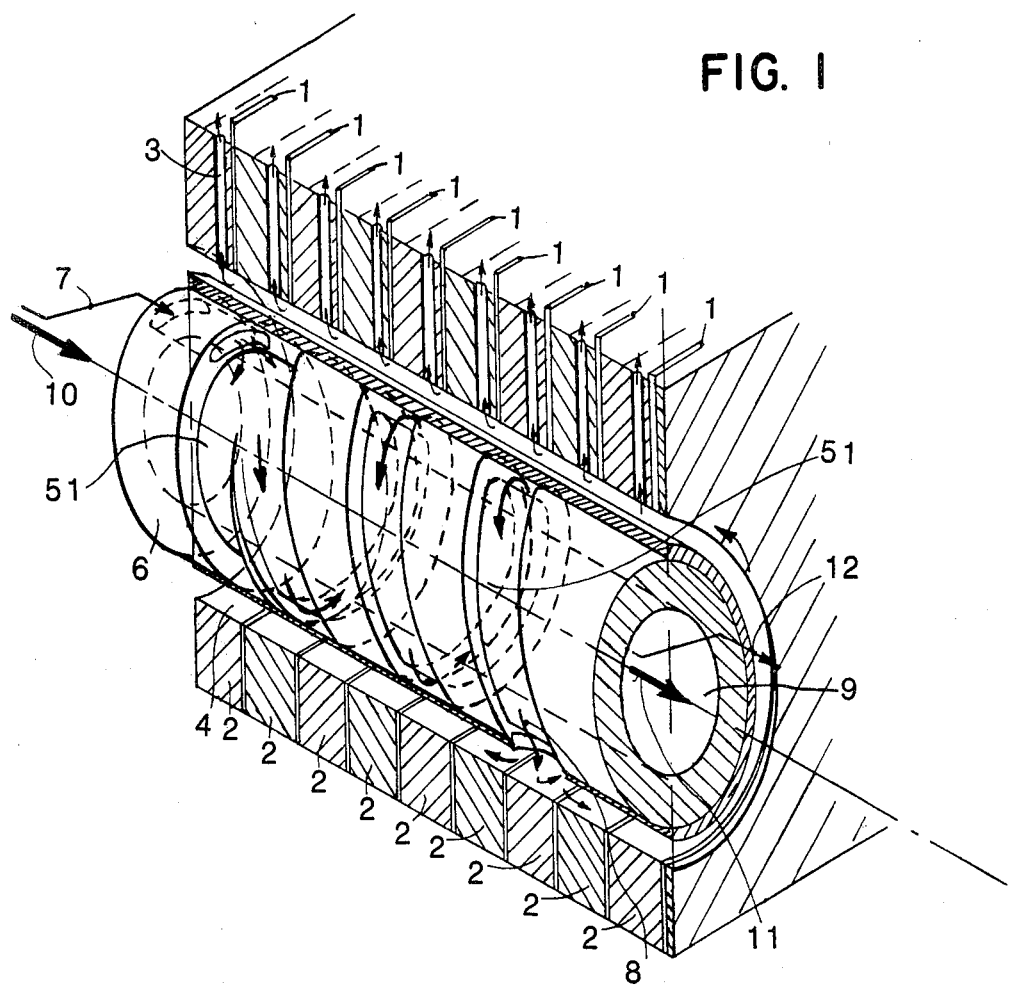

DEVICE FOR SUPPLY AND DISCHARGE OF LIQUID ELECTROLYTE FOR AN ELECTROLYZER OF FILTERPRESS TYPE

FIELD OF THE INVENTION

The present invention refers to a device for supply and discharge of electrolyte for an electrolyzer of filterpress type, for example, for an electrolyzer of the type referred to in French Pat. Nos. 2.448.581 and 2.448.583

BACKGROUND

Electrolyzers of filterpress type consist of a stack of elementary electrolytic cells, each elementary cell consisting of two parallel metallic electrode plates separated from one another so as to leave a gap which in turn is separated into two compartments by a plane diaphragm parallel with the electrodes. The compartment situated between the positive electrode or anode and the diaphragm is called the anodic compartment and the compartment situated between the negative electrode or cathode and the diaphragm is called the cathodic compartment. The electrolyte is made to flow on the one hand into the anodic compartment, the electrolyte then being referred to as anolyte, and on the other hand into the cathodic compartment, the electrolyte in it then being referred to as catholyte. In general each elementary cell is placed upright on its edge and the electrolyte flows from the bottom upwards; the liquid-gas mixtures due to the electrolytic reactions in the anodic compartment on the one hand and in the cathodic compartment on the other are then collected in the top portion of the electrolytic cell, whence the cathodic mixture and the anodic mixture are discharged separately.

In an electrolyzer of filterpress type consisting of a stack of a very large number of elementary cells, the following stacking will be found:
- a metal plate connected to the negative voltage generally consisting of the earth of the installation;
- a cathodic gap;
- a diaphragm;
- an anodic gap;
- a metal plate insulated electrically, of which the face turned towards the said anodic gap and charged by influence with positive electricity consequently forms the anode of the first cell, while the other face, necessarily charged with negative electricity by preservation of electricity, forms the cathode of the second cell;
- a second cathodic gap;
- a second diaphragm;
- a second anodic gap;
- a second metal plate insulated electrically;
- and so on until the last metal plate which is connected to the positive pole of the electric supply to the electrolyzer, and which forms the last anode. In practice the metal plate situated at about every fifty cells is a thick plate which enables the electrolyzer to be formed mechanically of a set of packs of cells.

Hence, in an electrolyzer of this type, the electrolyte is introduced into the bottom portion of each compartment by means of at least one inlet channel of small cross-section, and is later discharged from the said compartment at the top portion of it, likewise by means of at least one discharge channel of small cross-section. These channels are given a small cross-section within the bounds of hydraulic essentials, so that the leakage current through them is as low as possible.

Furthermore, in prior art electrolyzers, each of the cell discharge channels opens into a discharge channel common to all of the cells, one for the catholyte and one for the anolyte, each of these channels being parallel with the axis of the stack. Similarly, each of the inlet channels leaves, as the case may be, either only one common electrolyte inlet channel (see the aforementioned French Pat. No. 2.448.583), likewise parallel with the axis of the stack, or a first common channel of the same type but intended for the anodic compartments and a second channel of the same type but intended for the cathodic compartments (see the aforementioned French Pat. No. 2.448.581.).

These conventional electrolyte supply and discharge devices display two disadvantages prejudicial to the performance of the electrolyzer:
  firstly this supply and discharge is effected under pressures having a dynamic component which is much higher
for the cells near the inlet or outlet from the electrolyzer than for the cells which are remote from them; consequently the flows and as a result the differential pressures and the heating are not identical for all of the cells in the stack, which is very prejudicial not only to the performance of the electrolyzer but also to its length of life;
  secondly this type of feed by three or four distribution channels parallel with the axis of the stack introduces,
from the electrical point of view, three or four resistances of low value in parallel across the electrolyzer, in which a leakage current flows which causes a reduction in the performance of the electrolyzer by reduction of the useful current.

SUMMARY OF THE INVENTION

The device for supply and discharge of electrolyte in accordance with the invention enables these disadvantages to be alleviated and consequently the performance of the electrolyzer to be increased in substantial proportions, making it change, for example, from a value of about 0.9 to a value of about 0.97. Such a device is of the type which includes, for one and the same set of cells placed side by side:
  at least one electrolyte inlet circuit common to the said set, from which leave channels feeding separately each anodic compartment and each cathodic compartment;
  an anolyte outlet circuit common to the said set, at which terminate channels connected separately to each anodic compartment;
  a catholyte outlet circuit common to the said set, at which terminate channels connected separately to each cathodic compartment;
and it is characterized in that at least one of the said circuits includes at least one tranquilization chamber in which terminate all of the channels associated with the said circuit, the said tranquilization chamber being of small cross-section and being connected to the general electrolyte inlet or outlet by a duct exhibiting at least one portion of narrow shape twisted so as to confer upon the said portion of duct a great length and a small cross-section.

BRIEF DESCRIPTION OF THE DRAWINGS

The invention will be better understood by means of the following description of two non-restrictive embodiments, by reference to the attached drawings in which:

FIG. 1 is a perspective section of a supply to a portion of an electrolyzer, in accordance with the invention;

FIG. 2 shows the electrical diagram equivalent to a supply such as that which appears in FIG. 1;

DETAILED DESCRIPTION OF AN EMBODIMENT

Figure 3:
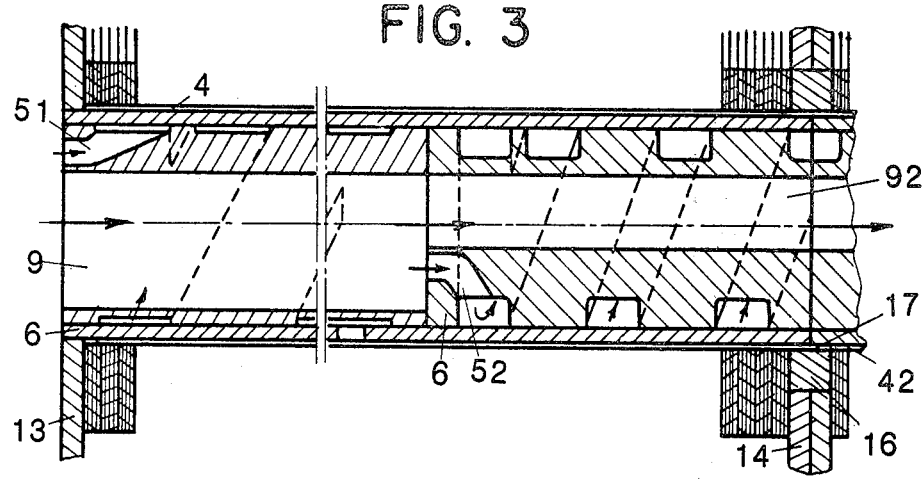
FIG. 3 is a simplified longitudinal section through a supply circuit in accordance with the configuration in FIG. 1, to the first pack of cells of an electrolyzer composed of a stack of a number of packs.

The perspective in FIG. 1 shows the feed to the anodic compartments of nine of the cells of an electrolyzer of filterpress type. For example, the feed shown might be that to the first cells of the first pack forming such an electrolyzer; under this assumption the stack shown would include at its left hand or upstream end the end cathodic plate connected to the earth of the installation. This plate has not been shown in FIG. 1, but it may be seen in FIG. 3.

In the drawing there may be distinguished first of all the metal electrode plates 1 and the insulating plates 2 forming a seal and a spacer between these plates. Likewise there may be seen the channels 3 for the supply of electrolyte to each anodic compartment. In order not to overload a drawing which is already very crowded, the diaphragms situated in the central portion between the electrode plates have not been shown; as a reminder of the exact positioning of these diaphragms, reference may be made to the upper portion of FIG. 3 of the aforesaid French Pat. No. 2.448.583.

In accordance with the invention and as clearly shown in the drawing, the channels 3 are fed with electrolyte from a semi-annular chamber 4 of thin cross-section which will be called later the "tranquilization chamber" into which the electrolyte is brought through a helical duct 51 of small cross-section, hollowed inside a tube 6 of insulating material and having a thick wall. As may be seen in the drawing, the electrolyte penetrates into the spiral 51 as indicated by the arrow 7 and leaves it into the chamber 4 as indicated by the arrow 8. Furthermore the piece 6 is pierced with a central orifice 9 which defines a longitudinal channel in which flows the electrolyte intended for feeding the later packs, as indicated by the arrows 10 and 11, the arrow 12 indicating the path of the electrolyte feeding the second spiral relating to the second pack. Although it has not been shown in the drawing, it may furthermore easily be understood that the tranquilization chamber 4 is closed at its left hand or upstream portion, by the end electrode as will appear clearly from FIG. 3. In an electrolyzer which includes only one pack, the chamber 4 would be closed downstream by the second end electrode, and the tube 6 which would not then include any central orifice 9 would be solid apart from the internal space taken by the spiral 51. In our case the electrolyzer includes twelve packs and the tranquilization chambers of two adjacent packs communicate, as will be made clear below.

FIG. 2 shows the electrical diagram, which is equivalent to an electrolyte feed such as that in FIG. 1. In this figure, the resistances Ra are the resistances of the channels 3, the resistances RA are the portions of resistance of the chamber 4 lying between two channels 3, the resistance RH is the resistance of the spiral 51, and the resistance Rc is the resistance of the channel 9 between the starting point and the second spiral. In the preceding sentence, "resistance" is to be understood as the resistance of the channel, duct or chamber when it is filled with electrolyte.

Referring to FIGS. 1 and 2 together, it may be seen that one has thus:

created a tranquilization chamber 4 which, by cancellation of the dynamic pressure which existed at the inlet, enables a flow of electrolyte to be assured which is identical for all of the elementary channels;

created a resistance matrix having a higher equivalent resistance than previous devices, firstly because the resistance of the tranquilization chamber 4 is much higher than that of the supply duct of the prior art, and secondly because the resistance RH of the spiral 51 is sufficiently high for its being placed in parallel across the resistances RA not to reduce too considerably the resistance of the said tranquilization chamber.

FIGS. 3 to 6 enable one to understand with still greater accuracy the structure of the remainder of the feed to the electrolyzer, which, to give an idea, is assumed to consist of twelve packs of fifty cells.

In the simplified section of FIG. 3 there may be seen besides the tube 6, the channel 9, the spiral 51 and the chamber 4 previously described with reference to FIG. 1, the end electrode 13, the electrode plate 14 bounding the other end of the first pack, a portion of the second spiral 52 feeding the second tranquilization chamber 42 relating to the second pack the start of which may be seen on the right of the figure, and the longitudinal duct 92 having as the channel 9 had for the second pack, the role of feeding the spiral 53 (FIG. 6) which in turn will feed the third pack.

Moreover, as may be seen in the drawing, the tranquilization chambers 4 and 42 communicate, thanks to an annular passage 17 left between an insulating ring 16 mounted at the bottom of the electrode plate 14, and the body 6. In this way, an optimum hydraulic distribution of fluid is obtained between the several tranquilization chambers, the parasitic pollution due to the phenomena of secondary electrolysis which is produced in the electrolyte lying in the tranquilization chambers is reduced to the utmost, and corrosion of the electrode plates is avoided.

Figure 4:
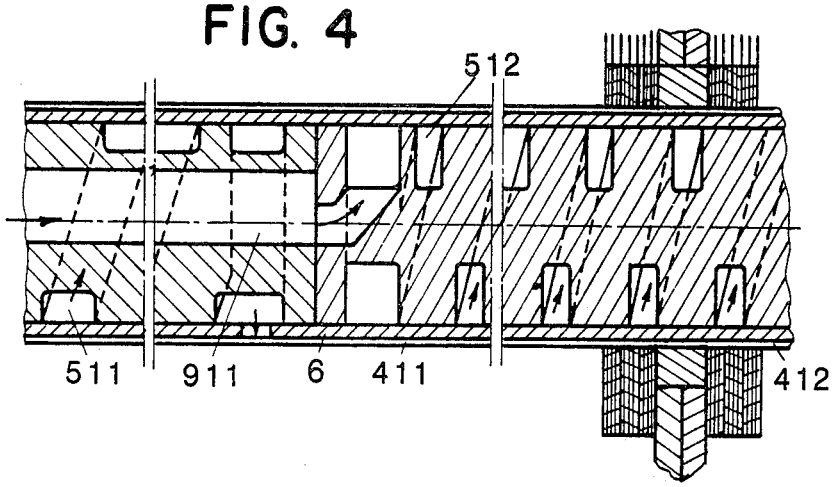
FIG. 4 is a simplified longitudinal section of the foregoing supply circuit, made at the level of the last but one pack and showing the delivery from the last pack.

Understanding of FIG. 4 follows easily from the above. That is, there may be seen in it the last but one spiral 511 feeding the last but one tranquilization chamber 411, the last longitudinal channel 911, and the last spiral 512 feeding the tranquilization chamber 412 of the twelfth and last pack, as may be seen more accurately in FIG. 5 in which there has likewise been designated by the reference 15 the end anodic plate of the electrolyzer, connected to the positive pole of its electrical supply. It will be observed, in particular in FIG. 4, that, as represented artificially on the drawing, the spiral does not seem to emerge at the middle of the associated tranquilization chamber. This is in reality only a conventional representation intended not to enlarge in an exaggerted manner the transverse dimensions of the drawing; it goes without saying that in reality each spiral opens out into the central plane of the associated tranquilization chamber, which enables optimum distribution of fluid.

Figures 5, 5A:
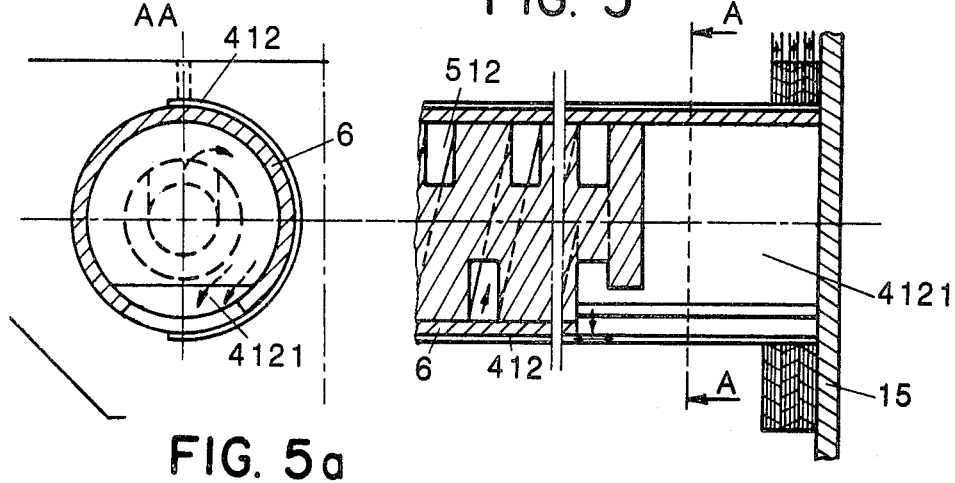
FIG. 5 is a simplified longitudinal section of the same circuit made at the level of the end of the last pack.
FIG. 5a is a section along line A—A in FIG. 5.

Moreover, as may be seen by means of FIGS. 5 and 5a, the tranquilization chamber 412 relating to the last pack ends in a portion 4121 of wide cross-section and in direct electrical contact with the end electrode 15, which has been found advantageous as far as it affects both the reduction in the pollution due to the phenomenon of secondary electrolysis, and the distribution of the currents in the electrolyzer.

Figure 6:
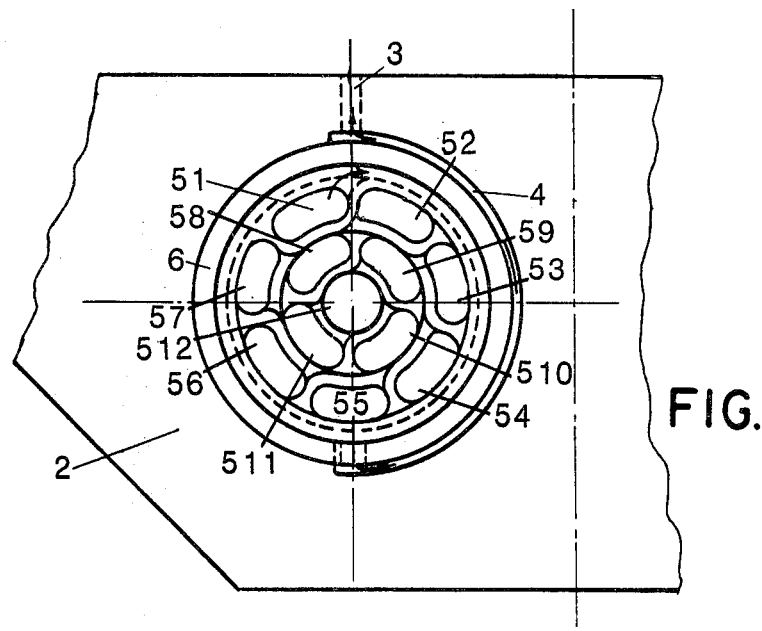
FIG. 6 is an end view of the same supply circuit along the direction indicated by arrow 10 in FIG. 1.

The end view in FIG. 6 offers the advantage of conveying the position of the starting ends of the twelve spirals (51 to 512), which feed the twelve tranquilization chambers of the electrolyzer feed with has just been described.

Figure 7:
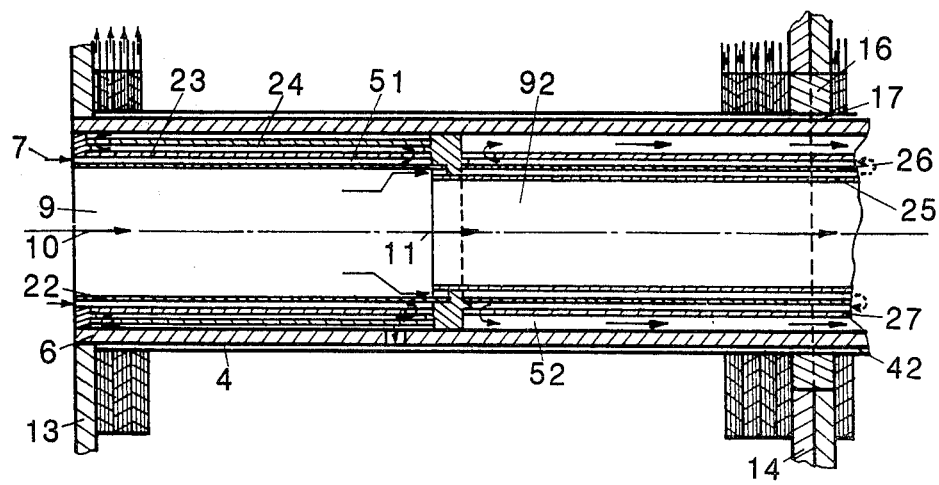
FIG. 7 is a simplified longitudinal section of a variant upon the supply circuit in accordance with the invention.

FIG. 7 is a simplified longitudinal section of a variant embodiment in which the duct in the shape of a spiral is replaced by a duct having a twisted path achieved by means of concentric tubes (22,23,24 and 25,26,27) which are open alternately at each end so as to leave between them thin spaces creating a labyrinth of narrow cross-section through which the electrolyte flows along a sinuous path, as may moreover be seen clearly in the drawing in which the reference numbers designating corresponding elements have been transcribed onto this variant embodiment.

It goes without saying that firstly the two examples of ducts having a sinuous path and a thin cross-section given above are not restrictive, and that secondly these two types of duct may very well be combined, possibly with others, in one and the same supply or discharge of electrolyte for an electrolyzer in accordance with the invention. Similarly the shapes and/or cross-sections of the said ducts and of the tranquilization chambers may be varied in their dimensions, in order to take into account essentials of hydraulic flow in particular which will always oblige a compromise to be found, because obviously the cross-sections cannot be reduced too much nor can the lengths of path be increased too much.

I claim:

1. A device for supply and discharge of electrolyte for an electrolyzer of filterpress type, including, for one and the same set of cells placed side by side:
    (a) at least one electrolyte inlet circuit common to the said set, from which leave channels feeding separately each anodic compartment and each cathodic compartment;
    (b) an anolyte outlet circuit common to the said set, at which terminate channels connected separately to each anodic compartment;
    (c) a catholyte outlet circuit common to the said set, at which terminate channels connected separately to each cathodic compartment;
    (d) one of said circuits comprising at least one tranquilization chamber (4) in which terminate all of said channels (3) associated with said circuit, said tranquilization chamber being of small cross-section and being connected to the general electrolyte inlet or outlet by a duct (51) exhibiting at least one portion of narrow shape twisted so as to confer upon said portion of said duct a great length and a small cross-section, and created in the body of a cylinder (6) bounding the inside of said tranquilization chamber.

2. A device for supply and discharge of electrolyte according to claim 1, wherein said tranquilization chamber (4) is a semi-annular chamber of thin cross-section in the form of an arc of a circle.

3. A device for supply and discharge of electrolyte according to claim 1, wherein said duct (51) emerges in the middle of said tranquilization chamber (4).

4. A device for supply and discharge of electrolyte according to claim 1 or claim 3, intended for an electrolyzer created in the form of a number of packs placed side by side, comprising one tranquilization chamber (4,42, . . . 411,412) and one twisted duct (51,52, . . . 511,512) per pack, said tranquilization chambers all communicating, and said cylinder (6) being common to all of the packs and being pierced with longitudinal channels (9,92, . . . 911) which communicate end to end with one another and feed with electrolyte the said twisted ducts (51,52, . . . 511, 512).

5. A device for supply and discharge according to claim 4, wherein communication between the chambers relating to two adjacent packs is effected by one or more passages (17) pierced through a piece of insulation (16) positioned at the bottom of the electrode plates (14) which connect the said adjacent packs with respect to one another.

6. A device according to claim 4, wherein said tranquilization chamber (412) relating to the last pack ends in a portion (4121) of enlarged cross-section in direct electical contact with the electrode located at the end of said pack.

7. A device for supply and discharge according to any one of claims 1 to 3, wherein at least some of said twisted duct or ducts have a spiral shape.

8. A device for supply and discharge according to any one of claims 1 to 3, wherein said twisted duct or ducts consist of a series of concentric tubes (22, 23, 24 and 25, 26, 27) separated by thin gaps and open alternately at each end so as to create a labyrinth of narrow cross-section through which the electrolyte flows along a sinuous path.

* * * * *